J. P. LORD,

Assignor to U. PRATT.

Keys for Musical Instruments.

No. 7,935. Reissued Nov. 6, 1877.

WITNESSES:
John Becker.
Fred. Haynes

INVENTOR
John P. Lord
by his Attorneys
Brown & Allen

UNITED STATES PATENT OFFICE.

JOHN P. LORD, OF MANCHESTER, NEW HAMPSHIRE, ASSIGNOR TO ULYSSES PRATT, OF DEEP RIVER, CONNECTICUT.

IMPROVEMENT IN KEYS FOR MUSICAL INSTRUMENTS.

Specification forming part of Letters Patent No. 144,399, dated November 11, 1873; Reissue No. 7,935, dated November 6, 1877; application filed May 26, 1877.

*To all whom it may concern:*

Be it known that I, JOHN P. LORD, of Manchester, in the county of Hillsborough and State of New Hampshire, have invented certain Improvements in Key-Caps for Key-Board Instruments, which improvements are fully set forth in the following specification and accompanying drawing.

This invention relates to the keys of key-board instruments, including pianos, organs, seraphines, melodeons, and other musical instruments having similar keys and key-boards.

One part of the invention consists in a key cap or covering applied not only to the top of the key, but continued or extended over and down its front end, thereby dispensing with independent veneers or coverings to the top and front end of the key, and adding to the beauty or finish of the latter, besides possessing other advantages.

Other parts of the invention have for their object the substitution of crystal caps for the ivory and ebony ones now generally used as coverings for the keys of key-board instruments. These latter parts of the invention relate to the compositions or materials from which the said caps are made, and to the manner of combining them with the keys; also, to the mode of ornamenting the said caps, and the compositions or materials used for that purpose.

Figure 1:
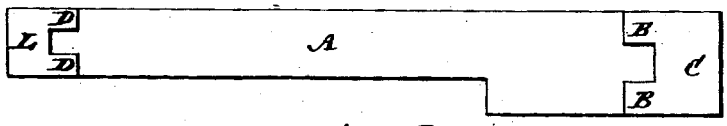
Figure 2:
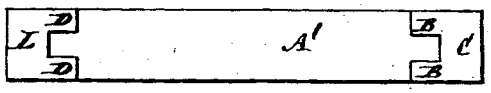
Figure 3:
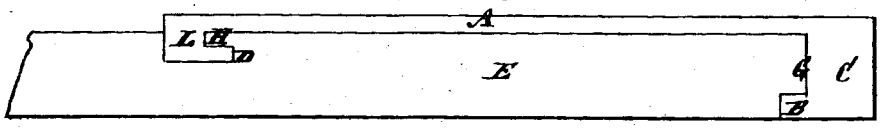
Figure 4:
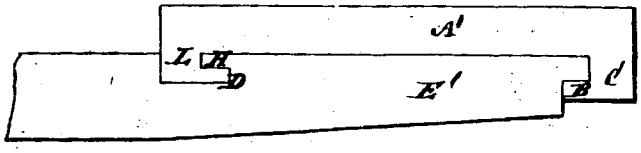
Figure 5:
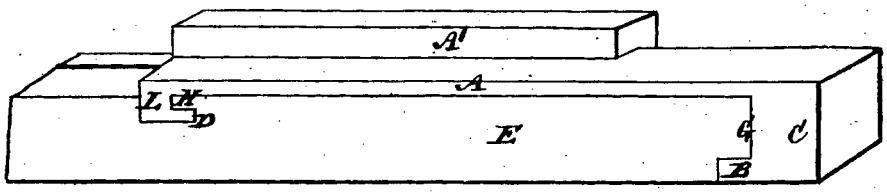

In the accompanying drawing, Figure 1 represents an under view of a cap suitable for covering a "natural" key (so called) of a key-board musical-instrument, and constructed in accordance with my invention. Fig. 2 represents an under view of a similar cap, suitable for covering the keys known as "flats" and "sharps" in such instrument. Fig. 3 represents a side view of the cap shown in Fig. 1 applied to a key, (natural.) Fig. 4 represents a side view of the cap shown in Fig. 2 applied to a key, (flat or sharp.) Fig. 5 is a perspective view of the caps applied to both kinds of keys combined.

A and A′ indicate the key caps or covers, which not only cover the tops of the keys, but are continued or extended over and down the front ends of the keys E E′. These caps A A′ may be made of artificial crystal, or what is known to the arts and trade as glass, porcelain, china-ware, stoneware, or compositions or materials of similar character—that is to say, capable of being molded, cast, cut, ground, or blown. Such caps may be cast or molded, cut, ground, or blown, and formed to suit the shape and size of the keys that they cover. They may be made one-eighth of an inch (more or less) in thickness, and so that their front ends C cover the front ends of the keys E E′, to which they are applied. Upon their bottoms are formed two lips, B B, which may be one-quarter of an inch long, wide, and deep, leaving a space, G, between the tops of the caps and the lips B B. The rear ends of said caps A A′ are made with two lips, D D, upon their bottoms, similar to the construction shown at their front ends, but a space of about one-eighth of an inch is left between the tops of the caps and the lips D D, as shown at H, and the ends L are fitted into the keys E E′. Said caps are made to cover only so much of the keys E E′ as project upon the lap of the key-board, and are secured by fitting the keys into the spaces G H, and glue or cement may be used to hold the caps, as thus fitted, to their places. These caps A A′ are made transparent or opaque, and are colored, stained, or painted of any desirable tint or shade. They are enameled or burnished, and ornamented with various designs or shapes, figures or letters, cast, cut, ground, blown, or etched therein, or may be ornamented with alloys, amalgams, gold leaf or foil, or with precipitates of gold or silver, or by plating them, so as to give them a reflecting character.

I claim—

1. A key for piano-fortes, organs, and other musical instruments, having the same veneer or covering which is applied to its top continued or extended over and down its front end, substantially as and for the purposes specified.

2. The method of uniting the caps A and A′ with their respective keys E and E′, by means of the lipped ends or portions L D and C B, substantially as shown and described.

3. The combination of the ornamented glass or crystal caps A and A′, constructed as described, with their respective keys E and E′, substantially as herein described, and for the purpose set forth.

JOHN P. LORD.

Witnesses:

CHAS. H. BARTLETT,

JAMES E. DODGE.